United States Patent
Guillotel et al.

(10) Patent No.: US 7,739,399 B2
(45) Date of Patent: Jun. 15, 2010

(54) DEVICE AND PROCESS FOR ADJUSTING THE BIT RATE OF A STREAM OF CONTENTS AND ASSOCIATED PRODUCTS

(75) Inventors: Philippe Guillotel, Vern sur Seiche (FR); Philippe Bordes, Laille (FR); Dominique Thoreau, Cesson Sevigne (FR)

(73) Assignee: Thomson Licensing, Boulogne-Billancourt (FR)

( * ) Notice: Subject to any disclaimer, the term of this patent is extended or adjusted under 35 U.S.C. 154(b) by 974 days.

(21) Appl. No.: 10/539,431

(22) PCT Filed: Dec. 15, 2003

(86) PCT No.: PCT/EP03/51012

§ 371 (c)(1),
(2), (4) Date: Jun. 20, 2005

(87) PCT Pub. No.: WO2004/062226

PCT Pub. Date: Jul. 22, 2004

(65) Prior Publication Data

US 2006/0056523 A1      Mar. 16, 2006

(30) Foreign Application Priority Data

Jan. 2, 2003    (FR) .................................. 03 00009

(51) Int. Cl.
G06F 15/16    (2006.01)
(52) U.S. Cl. ..................... 709/232; 709/231; 709/235; 370/252
(58) Field of Classification Search ................. 709/232, 709/231, 235; 370/252
See application file for complete search history.

(56) References Cited

U.S. PATENT DOCUMENTS

| 5,694,397 | A | * | 12/1997 | Burton | ........................ 370/516 |
| 6,072,994 | A | * | 6/2000 | Phillips et al. | ................. 455/84 |
| 6,132,306 | A | * | 10/2000 | Trompower | ................ 455/11.1 |
| 6,178,448 | B1 | * | 1/2001 | Gray et al. | ................... 709/224 |
| 6,594,699 | B1 | * | 7/2003 | Sahai et al. | ................. 709/228 |

(Continued)

OTHER PUBLICATIONS

H. Schulzrinne et al: "RFC 1889: RTP: A Transport Protocol for Real-Time Applications", Network Working Group Request for Comments, Jan. 1996, pp. 1-38 .

(Continued)

Primary Examiner—Saleh Najjar
Assistant Examiner—Waseem Ashraf
(74) Attorney, Agent, or Firm—Robert D. Shedd; Paul P. Kiel; Guy H. Eriksen

(57) ABSTRACT

The present invention relates to a device and a process for adjusting the bit rate of a stream of contents as a function of processing capabilities of at least one receiver. These contents are transmitted by a sender to the receiver according to a communication protocol providing for a return transmission of reception data of the contents by the receiver to the sender, including at least one parameter relating to conditions of communication of these contents in the network. The device comprises a module for estimating a required level for the bit rate as a function of information relating to these capabilities and a writing module modifying this parameter, to transmit, in return, to the sender stream adjustment cues capable of bringing about a modification of the bit rate in relation to the required level. Application to streaming.

13 Claims, 2 Drawing Sheets

U.S. PATENT DOCUMENTS

| | | | |
|---|---|---|---|
| 6,643,496 B1* | 11/2003 | Shimoyama et al. | 455/69 |
| 6,701,372 B2* | 3/2004 | Yano et al. | 709/232 |
| 6,807,156 B1* | 10/2004 | Veres et al. | 370/252 |
| 6,986,158 B1* | 1/2006 | Terui et al. | 725/116 |
| 7,093,028 B1* | 8/2006 | Shao et al. | 709/240 |
| 7,142,506 B1* | 11/2006 | Pogrebinsky | 370/229 |
| 7,225,266 B2* | 5/2007 | Ameigeiras et al. | 709/235 |
| 7,327,676 B2* | 2/2008 | Teruhi et al. | 370/230 |
| 2001/0004352 A1* | 6/2001 | Watanabe et al. | 370/252 |
| 2002/0131496 A1* | 9/2002 | Vasudevan et al. | 375/240.11 |
| 2002/0136298 A1* | 9/2002 | Anantharamu et al. | 375/240.12 |
| 2003/0050062 A1* | 3/2003 | Chen et al. | 455/435 |
| 2003/0067877 A1* | 4/2003 | Sivakumar et al. | 370/232 |
| 2003/0069963 A1* | 4/2003 | Jayant et al. | 709/224 |
| 2003/0103243 A1* | 6/2003 | Watanabe et al. | 358/405 |
| 2003/0115504 A1* | 6/2003 | Holliman et al. | 714/25 |
| 2003/0206558 A1* | 11/2003 | Parkkinen et al. | 370/477 |
| 2004/0193762 A1* | 9/2004 | Leon et al. | 710/52 |
| 2005/0011365 A1* | 1/2005 | Lamy et al. | 99/326 |
| 2005/0089092 A1* | 4/2005 | Hashimoto et al. | 375/240.03 |
| 2006/0174023 A1* | 8/2006 | Horn et al. | 709/231 |
| 2006/0209873 A1* | 9/2006 | Knabchen et al. | 370/443 |
| 2007/0162981 A1* | 7/2007 | Morioka et al. | 726/30 |

OTHER PUBLICATIONS

Wolisz Sisalem: "MLDA" A TCP-friendly congestion control framework for heterogenous multicast environments International Workshop on Quality of Service, Jun. 5-7, 2000.

Search report dated May 12, 2004.

* cited by examiner

US 7,739,399 B2

DEVICE AND PROCESS FOR ADJUSTING THE BIT RATE OF A STREAM OF CONTENTS AND ASSOCIATED PRODUCTS

This application claims the benefit, under 35 U.S.C. 365 of International Application PCT/EP03/51012, filed Dec. 15, 2003, which was published in accordance with PCT Article 21(2) on Jul. 22, 2004 in English and which claims the benefit of French patent application No. 0300009, filed Jan. 2, 2003.

FIELD OF THE INVENTION

The present invention pertains to a device and to a process for adjusting the bit rate of a stream of contents as a function of processing capabilities of one or more receivers, as well as to associated products.

BACKGROUND OF THE INVENTION

More and more user terminals, such as in particular personal computers (PCs) and personal digital assistants (PDAs), are based on generic platforms on which software is implemented. This trend relates in particular to audio/video readers.

However, the capabilities of terminals are often very different, both in terms of CPU (standing for "Central Processing Unit") performance and in terms of available memory. It is therefore necessary to define techniques that tailor either the content to the terminal, or the terminal to the content.

Known solutions relating to the tailoring of the terminal to the content consist in performing a selective decoding if the terminal does not succeed in decoding all the data in real time. For example, during the receipt of an MPEG2 (standing for "Moving Picture Experts Group") video stream, which conventionally comprises images of types I (decoded by themselves), P (decoded with the aid of earlier images) and B (decoded with the aid of earlier and later images), the overwhelmed terminal does not decode the B images (the latter not being used for the prediction of the subsequent images).

In transmission applications with no return path, by broadcasting or multicasting, this solution allows effective adaptation, although it leads to information losses that may prejudice the quality of reception.

By contrast, in point-to-point applications, it is possible to avoid this problem by tailoring the send bit rates to the terminals. To do this, according to a known technique, a prior step of negotiation is implemented between the target terminal and a client so that the performance of this terminal is communicated to the sender. The sender then chooses a content which may be decoded in real time by the terminal. This technique relies on the defining of a protocol making it possible to exchange information of this type, and on the defining of a measure of the performance of the terminal.

Among the methods disclosed pertaining to the tailoring of a sender to the capabilities of a receiver, Japanese document JP2000-270330 discloses a tailoring of send bit rates as a function of processing capabilities for terminals with decoders, by means of a prior notification to the sender of these capabilities by the receiver terminals.

It emerges from the disclosure of this document that a specific transmission protocol must be agreed between the sender and the receiver so as to achieve same, this having the drawback of requiring the implementation of a system that is coherent both as regards the senders and the receivers concerned. Moreover, such a procedure can benefit from a relatively wide application only in so far as it forms the subject of a recognized standardization.

Moreover, standardized techniques are commonly employed to tailor send streams to data circulation conditions within a point-to-point network. Thus, in the RTCP (standing for "Real-Time Control Protocol"), protocol the round trip time (RTT) for IP (standing for "Internet Protocol") packets between a sender and a receiver is notified to the sender, which can take appropriate measures to modify the stream sent. This provision is particularly useful for reacting to congestion in the network. In the case of an algorithm of the "TCP-friendly" type, an error rate observed at the receiver ("loss event rate", denoted "p") is also communicated to the sender, which can thus tailor its send stream and generate protection to errors as a function of the error rate measured.

The use of the round trip time RTT has formed the subject of specific improvements aimed at taking account of the capacity of a buffer memory at the receiver level. Specifically, such a buffer memory prolongs the time to be taken into account when adjusting the bit rate of the send stream. Thus, document JP2001-257715 discloses a sender having an information processing section capable of calculating the RTT from an acknowledgement of receipt originating from the receiver. The processing section extracts a transmission bit rate corresponding to this RTT and to cues, appended to the acknowledgment of receipt, regarding the amount of storage of a buffer memory associated with the terminal. A bit rate control section then modifies the actual transmission bit rate on the basis of this extracted bit rate. This technique makes it possible to act on the transmission bit rate, so as to obtain good real-time reproduction and to avoid network congestions.

These methods, which make it possible to take account of the capacities of buffer memories for bit rate variations, require particular implementations at the levels of the senders and receivers, as well as specific communication protocols. Moreover, they leave intact the problem of tailoring to the processing capabilities of receivers.

A tempting solution for further improving the appropriateness of the send bit rate would consist in sending beforehand a notification informing the sender of the capabilities of the receiver, as described in document JP2000-270330, then in transmitting to the sender, during transmission, acknowledgements of receipt containing not only the RTT but also cues regarding the buffer memory of the receiver, as described in document JP2001-257715. The sender, through judiciously combined algorithms, would tailor its send stream by considering both types of information.

SUMMARY OF THE INVENTION

Although such a combination may prove to be effective for producing good fluidity of the real-time decoding, it retains the need for an implementation in the senders and the receivers and for the deployment of a specific protocol. Moreover, it leaves in existence considerable uncertainty regarding the acceptance of this specific protocol within wide area networks (called WAN networks) such as the Internet, unless implementation is limited to a restricted pool of compatible send and receive terminals.

The present invention relates to a device for the adjustment of the bit rate of a stream of contents as a function of processing capabilities of at least one receiver, which enabler simple and effective implementation and can be applied without particular difficulty to a very large number of senders and receivers, possibly of distinct models, without it being necessary to have a new specific communication protocol be adopted.

The invention also relates to an adjusting process, a reception terminal and a computer program corresponding to the device of the invention.

It applies in particular to the field of RTCP communications, in particular over the Internet, but also over other WAN networks and over local area networks (called LAN networks). Moreover, the invention is most especially beneficial in respect of continuous transmissions (referred to as "streaming") of video streams, such as for example video on demand (VOD), or for the retransmission of events live over the Internet.

For this purpose, the subject of the invention is a device for the adjustment of the bit rate of a stream of contents as a function of processing capabilities of at least one receiver. These contents are transmitted by a sender to this receiver via a network, according to a communication protocol providing for a return transmission of reception data of the contents by the receiver to the sender. This device comprises:
- a module for inputting information relating to these capabilities,
- a module for estimating a required level for the bit rate at least as a function of this information,
- and a module for writing stream adjustment cues that is intended to write the adjustment cues for return transmission with the reception data to the sender, these adjustment cues being capable of bringing about a modification of the said bit rate in relation to the required level.

According to the invention, the communication protocol providing for a return transmission to the sender of at least one parameter relating to conditions of communication of the contents in the network between the sender and the receiver, the writing module is intended to modify this parameter in such a way as to use it to transmit the adjustment cues.

The expression "processing capabilities" of a receiver is understood to mean resources of the receiver fit for processing the data received, for example for a decoding of an MPEG 2 stream. These capabilities may therefore include in particular a data processing speed (typically a CPU, standing for Central Processing Unit, performance), a memory volume (such as that of a RAM memory—standing for Random Access Memory), an energy consumption and/or a presence of components dedicated to the processing of the contents (for example a hardware decoder). On the other hand, this definition excludes entities having pure stream regulation functions, in this instance buffer memories.

Unexpectedly and atypically, the processing capabilities of the receiver are used to influence a parameter of the protocol normally devoted to properties of circulation around the network. Moreover, this parameter is modified upstream of the return transmission to the sender, which also contrasts sharply with the known techniques in which adjustment algorithms are implemented at the sender level.

This procedure is all the more surprising as by acting thus at the level of the receiver (or of a set of receivers), one has the possibility of unburdening the sender of any specific operation of tailoring to the receiver, even though this sender has no implementation in relation to the processing capabilities of the receiver. This result is obtained by acting on a parameter of the protocol which is normally targeted at communication conditions in the network, but to which an additional function is allocated: to implicitly incorporate information regarding the capabilities of the receiver.

Linking the processing capabilities of the receiver to such a parameter is unexpected, even with regard to the disclosure of document JP2001-257715 regarding the return transmission of the capacity of a buffer memory, with the RTT time.

Specifically, the buffer memory fulfils a role directly related to the fluidity of the exchanges, and is a natural extension of the concept of time of travel of the data between the sender and the receiver—when queues increase in buffer memories, the transmissions are slowed down and the RTT time rises. Such is not the case for the processing capabilities of the receiver, with no immediate apparent relation to communication conditions in the network.

The adjustment device of the invention is very advantageous in particular in that it permits a procedure for adjusting the bit rate to the processing capabilities of the receiver, totally transparent to the sender. The latter in fact acts in accordance with the provisions of the protocol, with the aim of guarding against network congestions.

An essential consequence of this situation is that it is not necessary to modify the send appliances, or to add dedicated devices to them. On the contrary, any sender in agreement with the communication protocol may be suitable. Only the receivers need to be provided with specific means, by incorporating these means either within themselves, or in an appropriate added system. Another consequence of this situation is that the protocol does not have to be modified and also that it is not necessary to define an additional protocol. Consequently, with the proviso that the receivers are tailored, the adjustment device of the invention is applicable as long as a protocol is in place that provides for return transmission of reception data including a parameter relating to communication conditions in the network.

It is moreover advantageous to combine the technique of the device of the invention with a consideration of the buffer memory. In this case, preferably, the capacity of this buffer memory is considered directly through a modification of a parameter of the protocol, which may be identical to the parameter utilized for the processing capabilities of the receiver. Thus, as indicated previously, it is not necessary to modify the senders, and the standard communication protocol can be utilized.

The adjustment device of the invention can make it possible not only to adapt precisely to the processing capabilities of the receiver, but also to do so even when these capabilities vary over time. Preferably, provision is made to act in a completely automated manner, including when establishing the processing capabilities of the receivers. The operations performed are thus totally transparent to the users.

The adjustment device of the invention can be implemented directly in a user reception terminal, for example in the form of an internal quality manager determining the desired transmission bit rate and then acting accordingly on the parameter or parameters used. It may also be implemented in a stand-alone system disposed between the receiver and the network. A stand-alone system such as this may also be associated with several receivers, and take account of their diverse processing capabilities. The latter realization is particularly beneficial in respect of a geographically defined group of terminals, for example in premises or an enterprise.

The reception data are preferably transmitted, in return, via the communication network used for despatching the contents stream.

According to a preferred form of the communication protocol, the latter is the RTCP protocol. The invention may also be applied to a point-to-point network and protocol, or also to a multicast (for groups of terminals).

In a first preferred mode of realization of the parameter of the protocol, the latter is designed to serve to calculate a round trip transmission delay between the sender and the receiver. The parameter of the protocol then advantageously comprises a delay introduced at the receiver between a moment of reception of the contents and a moment of sending of the reception data by the receiver. In the RTCP protocol, in particular, the transmission delay is the RTT time, which is modified at the level of the receiver by acting on the delay called DLSR (standing for "Delay since Last Sender Report") separating the reception of the contents from the sending of the reception data.

In a second preferred mode of realization of the parameter of the protocol, the latter comprises a contents loss rate. In the RTCP protocol, in particular, this loss rate p may be utilized in so far as the sender uses a TCP-friendly (standing for "Transmission Control Protocol") algorithm.

These two modes of realization pertaining to the parameter of the protocol are advantageously combined, the adjustment device being capable of modifying either of the two types of parameters, or even both parameters at once.

The advantage of choosing DLSR as parameter for modifying the RTCP protocol is that it applies to algorithms other than TCP-friendly ones. In fact, whichever is the sender having a congestion control algorithm, this sender adapts to the processing capabilities of the receiver when the adjustment device is implemented at the level of the receiver. Moreover, this parameter avoids any unnecessary generation of error protection, specific to the use of the loss rate.

On the other hand, the advantage of choosing p as modification parameter of the RTCP protocol (when it can be used) is that it makes it possible to act directly on the parameter concerned, while the modification of the DLSR parameter induces uncertainties in the effect obtained as regards the RTT time, the latter depending also on the speed with which the reception data circulate between the receiver and the sender.

Advantageously, the writing module is capable of modifying the parameter (or parameters) of the protocol by means of several successive variations of this parameter. This realization is particularly judicious when it is not possible to directly modify the decisive parameter at the send level, but when it is acted on by way of an accessory parameter.

This applies in particular to the DLSR parameter, which makes it possible to indirectly modify the RTT time. According to the present mode of realization, successive incrementations of DLSR are carried out at the receiver level, in order to accurately adjust the bit rate of the contents stream. With respect to this improved version, the use of the loss rate retains on the one hand an advantage in that it avoids such iterations, and on the other hand the drawbacks mentioned above.

In improved modes of realization of the adjustment device of the invention, the latter does not take account only of the processing capabilities of the receiver to tailor the transmission bit rate of the contents. As already mentioned, the capacity of a buffer memory can in particular be involved in adjusting the RTT of the RTCP protocol, via the DLSR, but other realizations are particularly beneficial.

In particular, advantageously, the estimation module is capable of determining a value to be attained for the bit rate of the stream of contents not only as a function of the processing capabilities of the receiver, but also as a function of a rate of sharing of the capabilities of the receiver. In this way it is possible to manage the bit rates of several streams processed in parallel in the receiver, while possibly imposing priorities. By way of illustration, one may decide that such a stream should not consume more than 30% of the processing capabilities (for example in terms of CPU sharing), the remaining 70% being equitably distributed between the other streams.

The input module and estimation module are preferably designed so that the processing capabilities of the said receiver comprise at least one criterion of performance of the receiver chosen from among a data processing speed, a memory volume, an energy consumption and a presence of components dedicated to the processing of the contents.

The invention also relates to a reception terminal characterized in that it comprises a device for adjusting bit rate in accordance with any one of the forms of the invention.

The invention applies also to a process for the adjustment of the bit rate of a stream of contents as a function of the processing capabilities of at least one receiver, corresponding to the device of the invention and preferably intended to be implemented by means of any one of the modes of realization of the invention. Advantageously, this network is a point-to-point communication network and the stream of contents is transmitted continuously (streaming).

The invention also pertains to a computer program product comprising program code instructions for the execution of the steps of the adjustment process according to the invention when this program is executed on a computer. The expression "computer program product" is understood to mean a computer program medium, which may consist not only of a storage space containing the program, such as a diskette or a cassette, but also of a signal, such as an electrical or optical signal.

BRIEF DESCRIPTION OF THE DRAWINGS

The invention will be better understood and illustrated by means of the following exemplary realizations and implementations, which are in no way limiting, with reference to the appended figures in which.

DESCRIPTION OF PREFERRED EMBODIMENT

In these figures, the functional entities described and illustrated do not necessarily correspond to physically separate entities, but may for example consist of functionalities of one and the same piece of software or of circuits of one and the same component.

Figure 1:
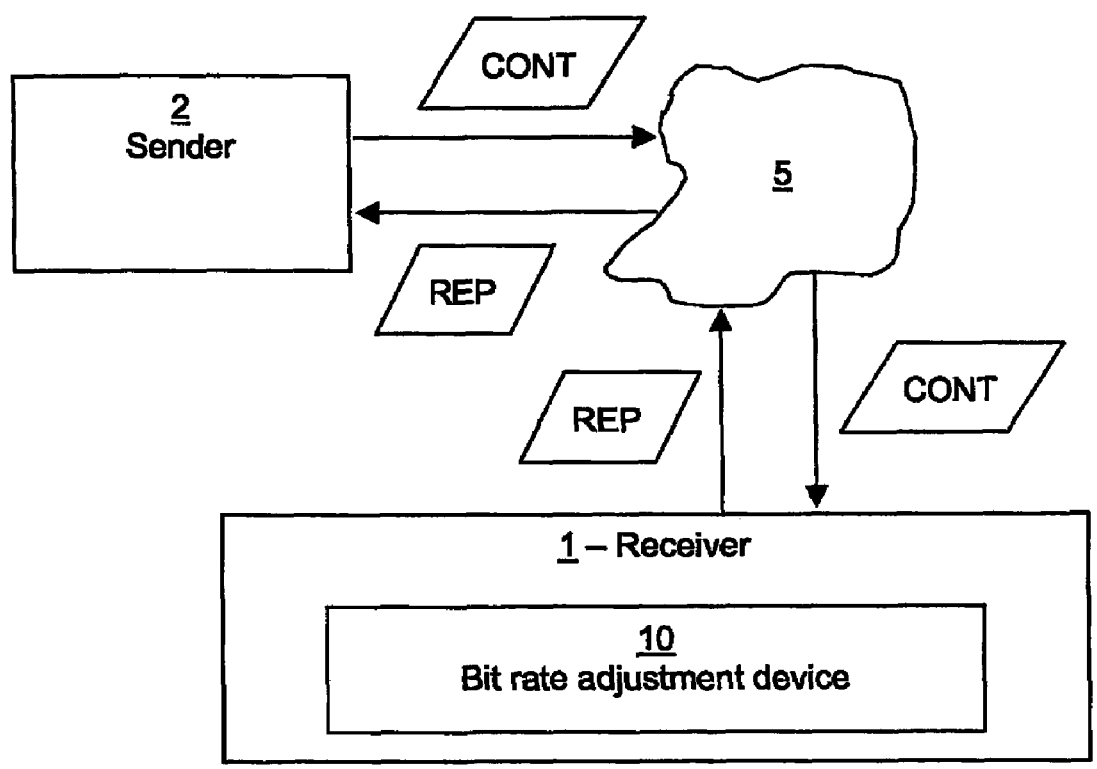
FIG. 1 is a diagram illustrating the principle of a send and receive assembly in which the receiver comprises an adjustment device according to the invention.
Figure 2:
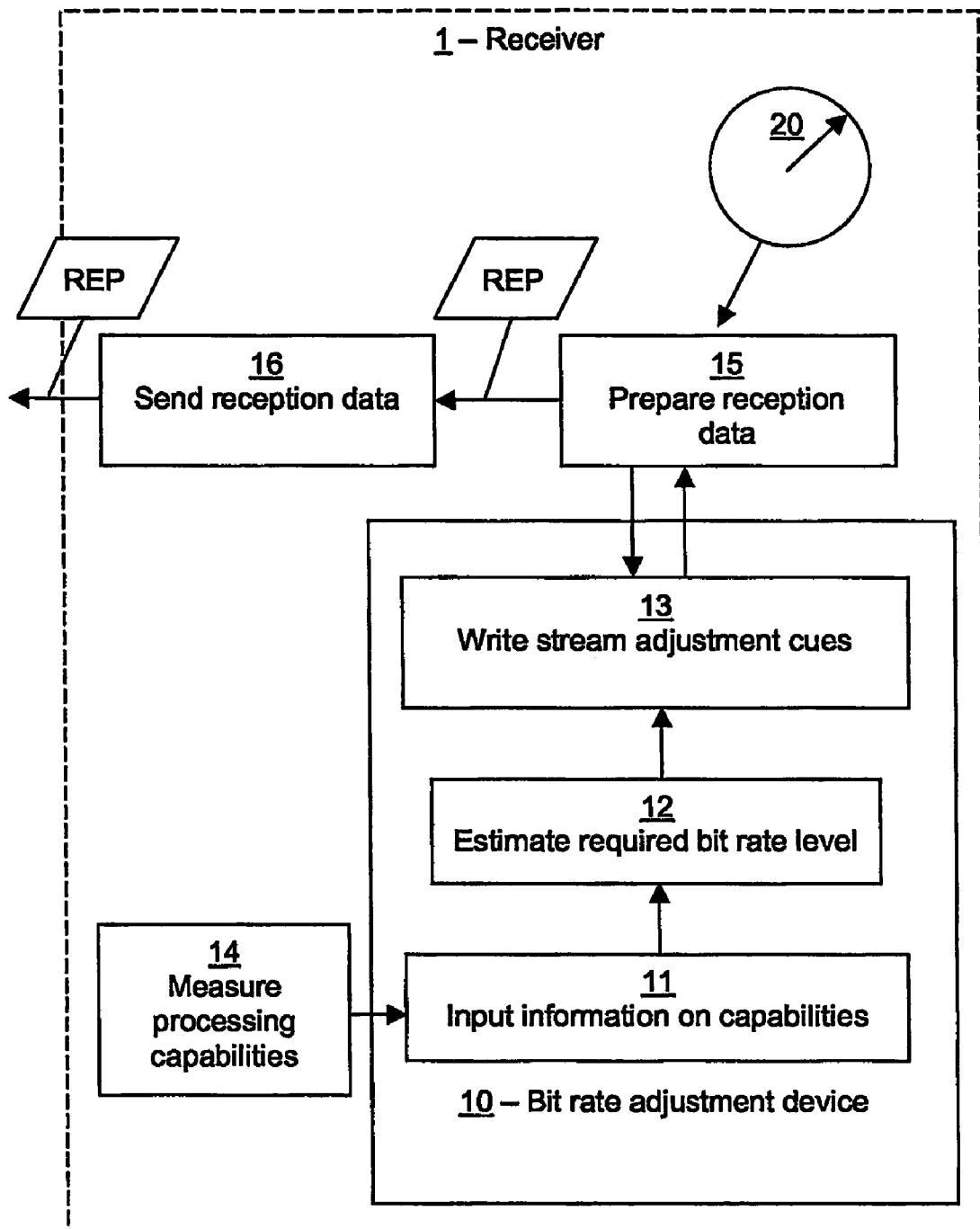
FIG. 2 details the receiver of FIG. 1.

An assembly for sending and receiving via a communication network 5 (FIG. 1) comprises a sender 2 of contents CONT and a receiver 1 of these contents CONT. According to a protocol for communication via the network 5, the receiver 1 is designed to send, in return, via the network 5 to the sender 2, reception data REP (standing for "Report") of these contents CONT. In particular these contents REP comprise one or more parameters relating to conditions of communication of the contents CONT in the network 5, these parameters being used by the sender 2 to modify the bit rate of the contents stream CONT, in such a way as to remedy problems of congestion in the network 5.

The receiver 1 is provided with a bit rate adjustment device 10, capable of modifying the abovementioned parameters. This adjustment device 10 is designed to estimate a required level for the bit rate of the stream of contents CONT as a function of the processing capabilities of the receiver 1, and to act accordingly on these parameters so as to bring about an adjustment of the bit rate at the level of the sender 2.

More precisely, the receiver 1 comprises, in addition to the adjustment device 10, a module 14 for measuring processing capabilities of the receiver 1, a module 15 for preparing the reception data REP, linked to a clock 20, and a module 16 for sending these data REP. The adjustment device 10 comprises for its part:

a module 11 for inputting information on the processing capabilities of the receiver 1, that are communicated by the measurement module 14, a module 12 for estimating required levels for the bit rate of the stream of contents CONT, and a module 13 for writing stream adjustment cues in the data REP, in communication with the preparation module 15 and intended to provide the module 15 with the instructions for modifying the parameters used to control the bit rate.

According to the exemplary application described, the protocol is RTCP and the network is the Internet.

In a first exemplary implementation, the calculation of the RTT (Round Trip Time) is used to apprise the sender 2 of the bit rate that the receiver 1 is capable of decoding.

The RTT is calculated by the sender 2 in particular on the basis of the delay DLSR received from the receiver 1 with the reception data REP. The mode of calculation of the RTT time is given by the RTCP protocol in essence in the following manner:

Last time stamp SR (standing for "Sender Report") (LSR standing for "Last SR": 32 bits—the 32 middle bits of the 64 in the time stamp NPT ( . . . ) received as part of the most recent SR packet from the source SSRC_n. If no SR has yet been received, this field is set to zero.

Delay since the last SR (DLSR): 32 bits—the delay, expressed in units of 1/65536 seconds, between the receipt of the last SR packet from the source SSRC_n and the despatching of the reception report block. If no SR packet has yet been received from SSRC_n, the DLSR field is set to zero.

The source SSRC_n can calculate the propagation delay for the round trip to SSRC_r (receiver sending the reception report) by recording the instant A of receipt of the reception report block, and by calculating the total round trip time (A−LSR) and then by subtracting from it the delay DLSR: (A−LSR−DLSR).

Next the congestion control algorithms deduce a so-called TCP-friendly bit rate that makes it possible to reduce the send bit rate in case of congestion, as the TCP protocol (standing for "Transmission Control Protocol") would have done. The algorithm given in the protocol is as follows:

The bit rate equation is:

$$X = \frac{s}{R*\sqrt{(2*b*p/3)} + (t\_RTO*(3*\sqrt{(3*b*p/8)}*p*(1+32*p^2)))}$$

where:

X is the transmission rate in bytes per second;

s is the size of packets in bytes;

R is the round trip journey time in seconds (RTT);

p is the loss events rate, between 0 and 1, given by the number of loss events as a fraction of the number of packets transmitted;

t_RTO is the retransmission idle time value in seconds;

b is the number of packets attested by a single TCP acknowledgement of receipt

By successive incrementations of the delay introduced at the receiver (DLSR), the RTT (R) is modified artificially so that the sender 2 is "made to believe" that the available bit rate is the one decodable by the receiver 1 and not the available network bit rate 5.

In a second exemplary implementation, the calculation of the loss rate p is used to apprise the sender of the bit rate that the receiver is capable of decoding. To do this, p is modified directly.

The invention claimed is:

1. Device for the adjustment of the bit rate of a stream of contents as a function of processing capabilities of at least one receiver, said processing capabilities being the resources of said at least one receiver fit for processing the data received, said contents being transmitted by a sender to said receiver via a network, according to a communication protocol providing for a return transmission of reception data of said contents by said receiver to said sender, said device comprising:

a module for inputting information relating to said capabilities, a module for estimating a required level for said bit rate at least as a function of said information, and a module for writing stream adjustment cues that is intended to write said adjustment cues for return transmission with said reception data to said sender, said adjustment cues being capable of bringing about a modification of said bit rate in relation to said required level, wherein said communication protocol providing for a return transmission to said sender of at least one parameter of the protocol normally targeted at conditions of communication of said contents in said network between said sender and said receiver, the writing module is intended to modify said parameter in such a way as to use it to transmit said adjustment cues.

2. Adjustment device according to claim 1, wherein said communication protocol is the RTCP protocol.

3. Adjustment device according to claim 1, wherein said parameter of the protocol is intended to serve to calculate a round trip transmission delay between said sender and said receiver.

4. Adjustment device according to claim 3, wherein said parameter of the protocol comprises a delay introduced at said receiver between a moment of reception of said contents and a moment of sending of said reception data by said receiver.

5. Adjustment device according to claim 1, wherein said parameter of the protocol comprises a contents loss rate.

6. Adjustment device according to claim 1, wherein said writing module is capable of modifying said parameter by means of several successive variations of said parameter.

7. Adjustment device according to claim 1, wherein said estimating module is capable of determining a value to be attained for said bit rate of said stream of contents also as a function of a rate of sharing of said capabilities of said receiver, said capabilities being shared between several streams processed in parallel in said receiver.

8. Adjustment device according to claim 1, wherein said input module and estimation module are designed so that said processing capabilities of the receiver comprise at least one criterion of the performance of said receiver chosen from among a data processing speed, a memory volume, an energy consumption and a presence of components dedicated to the processing of said contents.

9. Reception terminal wherein it comprises a device for adjusting bit rate in accordance with claim 1.

10. Process for the adjustment of the bit rate of a stream of contents as a function of processing capabilities of at least one receiver, said processing capabilities being the resources of said at least one receiver fit for processing the data received, said contents being transmitted by a sender to said receiver via a network, according to a communication protocol providing for a return transmission of reception data of said contents by said receiver to said sender, said process comprising the following steps:
- a required level for said bit rate is estimated, at least as a function of information relating to said capabilities,
- and stream adjustment cues for return transmission with said reception data to said sender are written, said adjustment cues being capable of bringing about a modification of said bit rate in relation to said required level,
- wherein said communication protocol providing for a return transmission to said sender of at least one parameter of the protocol normally targeted at conditions of communication of said contents in said network between said sender and said receiver, said cues are written while modifying said parameter, in such a way as to use it to transmit said adjustment cues,
- said adjustment process preferably being intended to be implemented by means of an adjustment device in accordance with claim 1.

11. Process for the adjustment of bit rate according to claim 10, wherein said network is a point-to-point communication network and the stream of said contents is transmitted continuously.

12. A processing device connected to a network, said processing device including a computer program readable medium comprising program code instructions stored thereon for adjusting a bit rate of a stream of contents as a functioning of processing capabilities of at least one receiver, said processing capabilities being the resources of said at least one receiver fit for processing the data received, said contents being transmitted by a sender to said receiver via the network, according to a communication protocol providing for a return transmission of reception data of said contents by said receiver to said sender, said processing device further comprising:
- a module for inputting information relating to said capabilities;
- a module for estimating a required level for said bit rate, at least as a function of said information;
- a module for writing stream adjustment cues for return transmission with said reception data to said sender, said adjustment cues being capable of bringing about a modification of said bit rate in relation to said required level;
- wherein said communication protocol provides for a return transmission to said sender of at least one parameter of the protocol normally targeted at conditions of communication of said contents in said network between said sender and said receiver, said cues are written while modifying said parameter, in such a way as to use it to transmit said adjustment cues.

13. Adjustment device according to claim 1, wherein the processing capabilities of said at least one receiver belong to the set of processing capabilities comprising:
- data processing speed;
- memory volume;
- energy consumption; and
- presence of components dedicated to the processing of the contents.

* * * * *